United States Patent [19]
Kokoshvili

[11] Patent Number: 5,028,104
[45] Date of Patent: Jul. 2, 1991

[54] FIBER OPTICS BYPASS SWITCH

[75] Inventor: Simon M. Kokoshvili, Mountain View, Calif.

[73] Assignee: Kaptron, Inc., Palo Alto, Calif.

[21] Appl. No.: 506,491

[22] Filed: Apr. 4, 1990

Related U.S. Application Data

[63] Continuation of Ser. No. 256,267, Oct. 11, 1988, abandoned, which is a continuation-in-part of Ser. No. 53,220, May 21, 1987, abandoned.

[51] Int. Cl.$^5$ .................................................. G02B 6/26
[52] U.S. Cl. .............................. 350/91.15; 350/96.16; 350/96.18
[58] Field of Search ............... 350/96.15, 96.16, 96.18, 350/96.20; 250/227; 370/4

[56] References Cited

U.S. PATENT DOCUMENTS

| | | | |
|---|---|---|---|
| 4,013,342 | 3/1977 | Narodny | 350/96.18 |
| 4,329,017 | 5/1982 | Kapany et al. | 350/96.15 |
| 4,484,793 | 11/1984 | Laude | 350/96.20 |
| 4,544,232 | 10/1985 | Laude | 350/96.15 |
| 4,591,237 | 5/1986 | Laude | 350/96.15 |
| 4,854,660 | 8/1989 | Gutterman et al. | 350/96.18 |

FOREIGN PATENT DOCUMENTS

| | | | |
|---|---|---|---|
| 159605 | 12/1981 | Japan | 350/96.15 |
| 167106 | 12/1981 | Japan | 350/96.20 |

OTHER PUBLICATIONS

"Product Information and Product Specification", for a Fiber Optic Fully Reversing Bypass Switch.
Ray Diagram for Five Fiber Bypass Switch.

*Primary Examiner*—Frank Gonzalez
*Attorney, Agent, or Firm*—Townsend and Townsend

[57] ABSTRACT

A bypass switch wherein a spherical reflector is movable between first and second positions relative to an array of optical transceivers, at locations, designated the "S" (source), "D" (detector), "I" (input fiber), "O" (output fiber), and "L1" and "L2" (first and second loop) locations. An optical fiber ("loop fiber") has its ends registered at the L1 and L2 locations. The six optical transceiver terminal locations are characterized by first and second symmetry points. The first symmetry point is midway between the S and O locations and midway between the I and D locations. The second symmetry point is midway the I and O locations, midway between the S and L2 locations, and midway between the L1 and D locations. In the first reflector position, the center of curvature is coincident with the first symmetry point. In the second reflector position, the center of curvature is coincident with the second symmetry point. A simple geometric configuration has the six transceiver locations equidistantly spaced along a line (S, D, I, O, L1, L2), with the first symmetry point between the D and I locations and the second between the I and O locations.

15 Claims, 2 Drawing Sheets

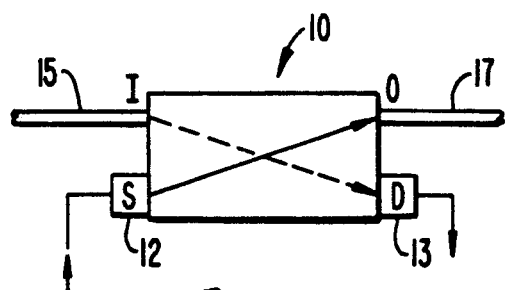
FIG._1A.
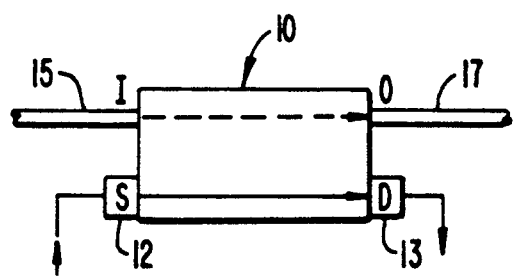
FIG._1B.
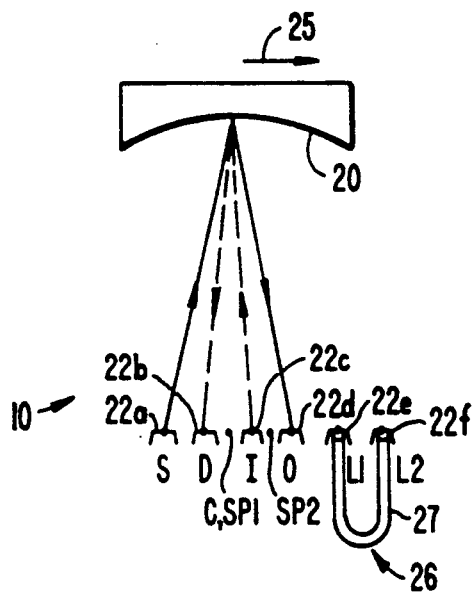
FIG._2A.
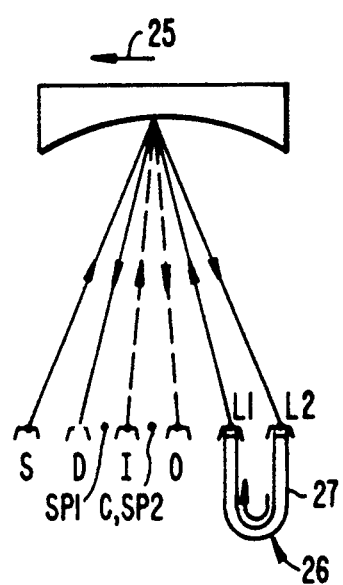
FIG._2B.
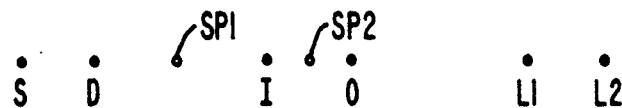
FIG._3A.
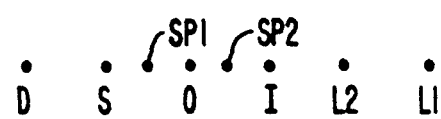
FIG._3B.

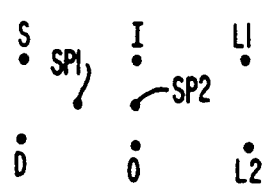
FIG._4A.
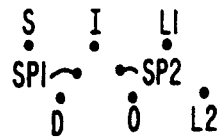
FIG._4B.
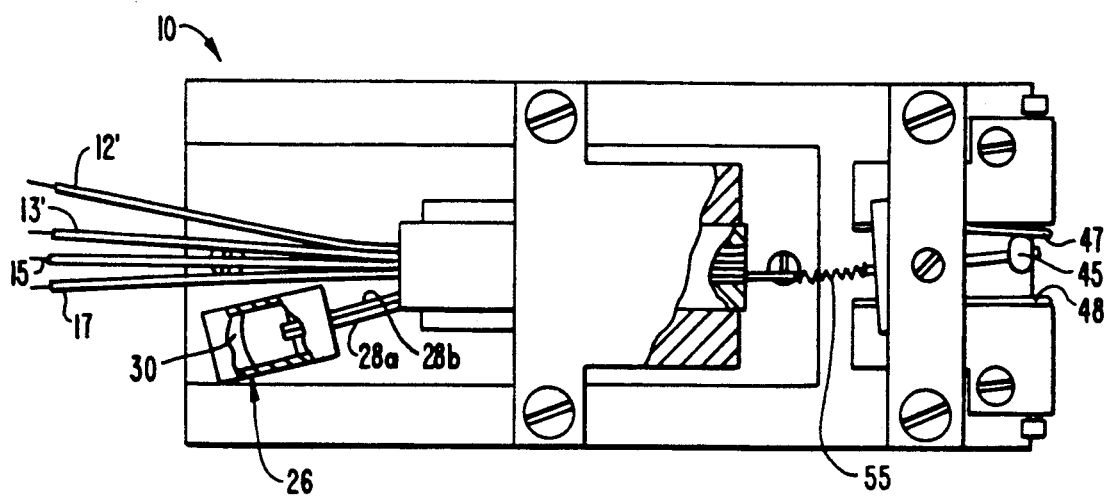
FIG._5A.
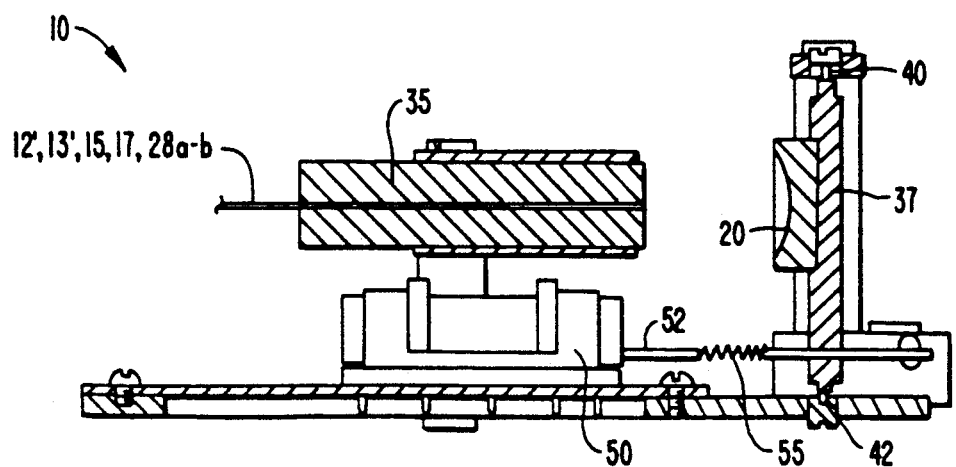
FIG._5B.

FIBER OPTICS BYPASS SWITCH

This is a Continuation of application Ser. No. 256,267, filed Oct. 11, 1988, now abandoned, which is a continuation-in-part of Ser. No. 053,220, filed May 21, 1987, now abandoned.

FIELD OF THE INVENTION

The present invention relates generally to devices for coupling optical fibers, and more specifically to a switch suitable for use in a fiber optic local area network ("LAN").

BACKGROUND OF THE INVENTION

U.S. Pat. Nos. 4,329,017 and 4,479,697 to Kapany et al. disclose a number of fiber optics communications devices for performing a wide variety of monitoring, splitting, switching, and multiplexing functions. The devices are based on the property of a spherical reflecting surface that a point source of light slightly displaced from the center of curvature is imaged with minimal aberration at a point symmetrically located with respect to the center of curvature. The disclosures of the '017 and '697 patents are incorporated by reference.

The '017 patent discloses a single pole/multiple throw switch wherein an input fiber and a plurality of output fibers are disposed with their ends generally coplanar. Switching is effected by tilting the spherical reflector so that the center of curvature is midway between the end of the input fiber and the end of the desired output fiber.

Developments in recent years have presented the need for a fiber optic bypass switch suitable for use in a local area network ("LAN"). In brief, such a switch, located at a node in a fiber optic LAN ring structure would couple an input fiber and an output fiber to a detector and a source, respectively. The switch would have a first, "active" state and a second, "bypass" state. In the active position the input fiber is optically coupled to the detector, and the source is optically coupled to the output fiber. In the bypass state, the input and output fibers are optically coupled to each other, and bypass the source and detector entirely.

SUMMARY OF THE INVENTION

The present invention provides a bypass switch suitable for use in a fiber optic LAN ring structure. The switch also features a node self-test channel in the bypass state wherein the node's source drives the node's detector. The switch provides attenuation in the self-test channel to prevent the source from saturating the detector, but maintains minimum light loss in the bypass channel.

Briefly, the switch contemplates moving a spherical reflector between first and second positions relative to an array of optical transceivers. In this context, an optical transceiver may be a source, a detector, or a fiber end. There are six optical transceiver locations, designated the "S" (source), "D" (detector), "I" (input fiber), "O" (output fiber), and "L1" and "L2" (first and second loop) locations. An optical fiber ("loop fiber") has its ends registered at the L1 and L2 locations.

The six optical transceiver terminal locations are characterized by first and second symmetry points. The first symmetry point is midway between the S and 0 locations and midway between the I and D locations. The second symmetry point is midway the I and O locations, midway between the S and L2 locations, and midway between the L1 and D locations.

In the first reflector position, the center of curvature is coincident with the first symmetry point, whereupon the S and O locations are conjugate and the I and D locations are conjugate. Thus, light emanating from the source is imaged on the end of the output fiber and light emanating from the end of the input fiber is imaged on the detector.

In the second reflector position, the center of curvature is coincident with the second symmetry point, whereupon the input fiber and output fiber ends are conjugate so that the node is bypassed. Light emanating from the source is imaged at the L2 location, enters the loop fiber, emerges from the loop fiber at the L1 location, and is imaged on the detector. Thus, the source and detector are coupled to each other. By introducing attenuation in the loop fiber, the source-detector channel can be provided with a suitable attenuation without affecting either the coupling of the input and output fibers in the bypass mode or the coupling of the source and detector to the input and output fibers in the active mode.

A simple geometric configuration has the six transceiver locations equidistantly spaced along a line (S, D, I, O, L1, L2). In such a case, the first symmetry point is between the D and I locations, the second between the I and O locations. However, the symmetry constraints on the location of the six optical transceiver terminal locations may be satisfied by many geometric configurations.

The loop function also may be implemented as a pair of short fibers and a second spherical reflector. The short fibers have respective first ends registered at the L1 and L2 locations, and respective second ends registered at a pair of conjugate locations of the second reflector.

A further understanding of the nature and advantages of the present invention may be realized by reference to the remaining portions of the specification and the attached drawings.

BRIEF DESCRIPTION OF THE DRAWINGS

FIGS. 1A-B are functional schematics of the operation of a bypass switch according to the present invention;

FIGS. 2A-B are optical schematics of the bypass switch;

FIGS. 3A-B illustrate alternate spacings and orderings for the transceiver terminal locations;

FIGS. 4A-B illustrate alternate configurations for the transceiver terminal locations; and FIGS. 5A-B are top plan and side elevational views showing a suitable switch construction.

DESCRIPTION OF THE PREFERRED EMBODIMENTS

FIGS. 1A-B are functional schematics of a fiber optic bypass switch according to the present invention. Switch 10 has four optical terminals that may, in general, accommodate sources, detectors, or fiber ends. For the particular application of a fiber optic local area network ("LAN"), the devices at the switch terminals would be a source 12 activated by the node's transmitter, a detector 13 that provides electrical signals to the node's receiver, and an input fiber 15, carrying inbound data, and an output fiber 17 carrying outbound data.

Switch 10 is a two-state device. FIG. 1A shows switch 10 in its first, or "active" state. In this state, light from source 12 is coupled to output fiber 17, while light from input fiber 15 is coupled to detector 13. That is, switch 10 in the active state couples its associated node to the network. FIG. 1B shows switch 10 in its second, or "bypass" state. In this state, light from source 12 is coupled to detector 13, while light from input fiber 15 is coupled to output fiber 17. That is, the node is effectively disengaged from the network. The coupling between source 12 and detector 13 can be considered to define a self-test channel that allows the node circuitry to verify the proper functioning of the source and detector.

FIGS. 2A-B are optical schematics showing the operation of switch 10. In broad terms, switch 10 comprises a concave, preferably spherical, reflector 20, six optical transceiver terminals 22a-f, an appropriate mechanical arrangement for providing movement of spherical reflector 20 (as suggested by arrows 25), and an optical loop device 26. Loop device 26 is any convenient device that is functionally equivalent to a looped fiber. For the purpose of explanation, loop device 26 can be assumed to consist of a length of optical fiber 27 (called the loop fiber). As will be described below, the loop device may be implemented other ways, most notably using an auxiliary concave reflector.

The optical characteristics of spherical reflectors are described in the aforesaid U.S. patents to Kapany et al, and will not be described in detail. It suffices to note that a spherical reflector has a center of curvature C that is a self-conjugate point, and any diametric plane acts as a self-conjugate plane whereupon a point source in the plane on one side of the center of curvature is imaged in the plane on the other side of the center of curvature.

Optical transceiver terminals 22a-f may be any convenient means for registering fiber ends, sources, or detectors at the desired points in the self-conjugate plane. Thus, the six transceiver terminals define six locations in the self-conjugate plane, referred to as the "S" (source), "D" (detector), "I" (input fiber), "O" (output fiber), "L1" and "L2" (first and second loop) locations. Source 12, detector 13, the end of input fiber 15, and the end of output fiber 17 are registered at the S, D, I, and O locations. The ends of loop fiber 27 are registered at the L1 and L2 locations. Since the six locations are preferably close to each other, and since most sources and detectors are larger than a fiber diameter, it is often convenient to have the source and detector located away from the transceiver terminal locations and optically coupled via a short length of fiber. In such a case, the six fiber ends could be disposed immediately adjacent one another.

As will be discussed below, the relative locations of optical transceiver terminals 22a-f are constrained, but the constraints leave a number of degrees of freedom in the design. The constraints may be stated as follows. The six locations are characterized by two symmetry points, denoted SP1 and SP2. Point SP1 is midway between the S and O locations, and midway between the I and D locations. Point SP2 is midway between the I and O locations, midway between the S and L2 locations, and midway between the L1 and D locations.

A special case that satisfies the constraints has the six locations equally spaced along a straight line in the following order: S, D, I, O, L1, L2. FIGS. 2A-B show this embodiment, with the spacing of the transceiver terminal locations exaggerated for clarity. In order to minimize aberrations, the locations are kept as closely spaced as possible.

FIG. 2A shows switch 10 in the first state with reflector 20 disposed with center of curvature C coincident with symmetry point SP1. This renders the S and O locations conjugate so that the light from source 12 is imaged on the output fiber 17 and the I and D locations conjugate so that light leaving the end of input fiber 15 is imaged on detector 13. No light enters either end of loop fiber 27.

FIG. 2B shows switch 10 in the second state with reflector 20 disposed with center of curvature C coincident with symmetry point SP2. This renders the I and O locations conjugate so that light leaving the end of input fiber 15 is imaged on the end of output fiber 17. Light from source 12 at the S location is imaged at the L2 location, enters loop fiber 27, emerges from the loop fiber at the L1 location, and is imaged on detector 13.

When the switch is in the bypass state, the light from source 12 travels over what can be called a self-test channel prior to reaching detector 13. This allows the node to which the switch is connected to verify proper operation of the source and detector. The self-test channel is purposely provided with a degree of attenuation (approximately 7-13 dB) in order to prevent the source from saturating the detector. At the same time, the other channels are required to cause minimal attenuation. This is easily accomplished since the general switch design is characterized by very low loss. The desired degree of attenuation can be provided in loop fiber 27. In fact, where the loop fiber is relatively sharply bent, the bending losses provide the required attenuation.

As alluded to above, the ordering and spacing of the transceiver terminals shown in FIGS. 2A-B represent a special case. The general case may be derived as follows. Assume the transceiver locations are disposed in a linear array along the x-axis and that the first symmetry point is at x=0. If the switch has a throw of A, the second symmetry point is at x=A. The x-coordinates of the transceiver locations obey the following set of equations:

$$x(S) + x(O) = 0 \quad (1)$$
$$x(I) + x(D) = 0 \quad (2)$$
$$x(I) + x(O) = 2A \quad (3)$$
$$x(S) + x(L2) = 2A \quad (4)$$
$$x(D) + x(L1) = 2A \quad (5)$$

Equations 1 and 2 are statements that the O and S locations and the D and I locations are symmetric about SP1 (assumed to be at x=0), while Equations 3-5 are statements that the I and O locations, the S and L2 locations, and the D and L1 locations are pair-wise symmetric about SP2 (assumed to be at x=A).

The system of five equations in six unknowns is characterized by one degree of freedom. This may be exploited by allowing a particular position's coordinate be selected. However, a somewhat better understanding may be realized as follows. Rearranging Equations 1, 2, 4, and 5 yields the following:

$$x(D) - x(S) = x(O) - x(I) = x(L2) - x(L1)$$

These may be written as follows:

$$x(D) - x(S) = B \quad (6)$$

$$x(O) - x(I) = B \quad (7)$$

$$x(L2) - x(L1) = B \quad (8)$$

where B is a characteristic spacing, which is the spacing between source and detector, between input and output, and between the loop fiber ends.

The characteristic spacing B can then be chosen to provide a wide variety of configurations. Clearly, if A and B remain in the same proportion, the same configuration is obtained, with only an overall scaling. Therefore, for the present discussion, absolute scaling will be ignored.

Table I shows the values for x-coordinates of the transceiver locations for a variety of choices of A and B. As can be seen, the embodiment shown in FIGS. 2A-B corresponds to the particular case of A=2 and B=2. FIGS. 3A-B illustrate alternate configurations for the transceiver terminal locations. In FIGS. 2A-B, the locations were equally spaced. However, this is not universally the case. For example, A=3 and B=2 yields unequal spacing, as shown in FIG. 3A. Moreover, the order need not be as shown in FIGS. 2A-B. For example, A=2 and B=−2 yields a situation with equal spacing of the locations, but a change in the order, as shown in FIG. 3B. Upon short reflection, one will realize that a negative characteristic spacing corresponds merely to an interchange of elements, which is equivalent to a reversal of light travel.

Not all cases are suitable for a physical embodiment, even if they satisfy the constraints. For example, A=2 and B=4 yields a situation where the D and I locations are coincident and the O and L1 locations are coincident. Thus, the locations must satisfy the non-holonomic constraint that none of the transceiver locations coincide with one another.

The discussion above assumed that the six transceiver locations were disposed along the x-axis. In fact, such is not necessary. Equations 1-5 represent the constraints on the x-coordinates. The y-coordinates satisfy a similar set of equations. FIGS. 4A-B show special cases where the S, I, and L1 locations are on a first straight line, and the D, 0, and L2 locations are on a second, parallel straight line. FIG. 4A shows a case where the S and D locations have the same x-coordinate, the I and O locations have the same x-coordinate, and the L1 and L2 locations have the same x-coordinate. FIG. 4B shows a situation where the six transceiver locations are arranged in a staggered array that allows for hexagonal close packing. This is especially useful where all the transceiver locations are occupied by fiber ends, since this allows the closest possible packing. It is noted that the x-coordinates for the close-packed configuration are in the same relationship as the linear configuration of FIGS. 2A-B.

The present invention may be practiced with any desired mechanical configuration for the switch. Indeed, the same mechanical arrangement that is used for a single-pole double-throw switch is suitable for the present invention.

FIGS. 5A-B are top plan and side elevational views showing a suitable construction for switch 10. The particular embodiment illustrated contemplates a source fiber 12' and a detector fiber 13' communicating to an external source and detector. Also, loop device 26 comprises a pair of fibers 28a and 28b and an auxiliary spherical reflector 30. Each of fibers 28a-b has first and second ends. The first ends are located at the L1 and L2 locations; the second ends are fixed relative to auxiliary reflector 30 at a pair of conjugate locations (preferably as close together as possible, with the center of curvature midway between).

The fibers are secured in a mounting block 35 that maintains the fiber ends in a coplanar relationship. The fiber ends are polished, and may also carry antireflection coatings. Mirror 20 is mounted on a post 37 to rotate about an axis defined by bearings 40 and 42. Post 37 carries an arm 45 engageable with a pair of adjustable stops 47 and 48 which define the limits of angular movement of the mirror. As discussed above, the two extreme positions of the mirror are such that the center of curvature is either midway between the detector and input fiber locations or midway between the input and output fiber locations.

Mirror 20 may be moved between these extreme angular positions by means of a latching relay 50, the output member 52 of which is coupled to arm 45 by a pre-stressed compression spring 55. Thus, in each of the two positions of output member 52, mirror 20 is biased to one of its extreme angular positions by spring 55 and remains in that position until relay 50 is actuated to drive the mirror to the other extreme angular position.

Fiber mounting block 35, mirror 20, relay 50, and the detent arrangement are preferably mounted within a housing, with a suitable feedthrough for fibers 12', 13', 15, and 17. A suitable electrical connection is provided to control actuation of relay 50.

Although the loop function utilizing the auxiliary reflector is more complicated than a simple loop fiber, it has certain advantages that normally render it preferable. The sharp bend for the loop fiber may cause enough stress to lead ultimately to failure. Additionally, by suitable selection of coating for reflector 30, the loss in the bypass channel can be better controlled than by relying on bending losses.

In conclusion, it can be seen that the present invention provides a simple, elegant, and yet surprisingly versatile design for a bypass switch. While the above is a complete description of the preferred embodiments of the invention, various modifications, alternate constructions, and equivalents may be used. Therefore, the above description and illustration should not be taken as limiting the scope of the present invention, which is defined by the appended claims.

TABLE 1

| A | B | x(S) | x(D) | x(I) | x(O) | x(L1) | x(L2) |
|---|---|------|------|------|------|-------|-------|
| 2 | 2 | −3 | −1 | 1 | 3 | 5 | 7 |
| 2 | −2 | −1 | −3 | 3 | 1 | 7 | 5 |
| 3 | 2 | −4 | −2 | 2 | 4 | 8 | 10 |
| 2 | 3 | −3.5 | −0.5 | 0.5 | 3.5 | 4.5 | 7.5 |
| 2 | 4 | −4 | 0 | 0 | 4 | 4 | 8 |
| 2 | 5 | −4.5 | 0.5 | −0.5 | 4.5 | 3.5 | 8.5 |
| 2 | 0 | −2 | −2 | 2 | 2 | 6 | 6 |

I claim:
1. A fiber optic bypass switch comprising:
   a concave reflector having a symmetry point;
   loop means defining a pair of optical fiber ends, called loop ends, for transmitting light from one of said loop ends to the other of said loop ends;
   first, second, third, and fourth optical transceiver terminals, each adapted to register a respective optical transceiver at one of four respective locations, designated the S, D, I, and O locations;

fifth and sixth optical transceiver terminals for registering said loop ends at respective fifth and sixth locations, designated the L1 and L2 locations;

means for effecting movement of said reflector relative to said optical transceiver terminals between a first disposition where said S and O locations are optically conjugate about said symmetry point and said I and D locations are optically conjugate about said symmetry point, and a second disposition where said I and O locations are optically conjugate about said symmetry point, said S and L2 locations are optically conjugate about said symmetry point, and said L1 and D locations are optically conjugate about said symmetry point such that optical paths between pairs of transceiver terminals are simultaneously switchable in connection with a loopback path defined through said loop means for enabling a self-test of functionality through said switch.

2. The switch of claim 1 wherein said loop means comprises a single optical fiber, the ends of which define said loop ends.

3. A fiber optic bypass switch comprising:
a concave reflector;
loop means, defining a pair of optical fiber ends, called loop ends, for transmitting light from one of said loop ends to the other of said loop ends, wherein said loop means comprises:
 first and second optical fibers, each having first and second ends;
 an additional concave reflector; and
 means for registering the respective first ends of said first and second fibers at a pair of optically conjugate locations with respect to said additional concave reflector;
 whereupon the respective second ends of said first and second fibers define said loop ends;
first, second, third, and fourth optical transceiver terminals, each adapted to register a respective optical transceiver at one of four respective locations, designated the S, D, I, and O locations;
fifth and sixth optical transceiver terminals for registering said loop ends at respective fifth and sixth locations, designated the L1 and L2 locations; and
means for effecting movement of said reflector relative to said optical transceiver terminals between a first disposition where said S and O locations are optically conjugate and said I and D locations are optically conjugate, and a second disposition where said I and O locations are optically conjugate, said S and L2 locations are optically conjugate, and said L1 and D locations are optically conjugate.

4. The invention of claim 1 wherein said six locations are disposed in a linear array.

5. The invention of claim 4 wherein said six locations are equally spaced.

6. A fiber optic bypass switch comprising:
a concave reflector;
loop means, defining a pair of optical fiber ends, called loop ends, for transmitting light from one of said loop ends to the other of said loop ends;
first, second, third, and fourth optical transceiver terminals, each adapted to register a respective optical transceiver at one of four respective locations, designated the S, D, I, and O locations;
fifth and sixth optical transceiver terminals for registering said loop ends at respective fifth and sixth locations, designated the L1 and L2 locations, wherein said six locations are disposed in two rows of three each; and
means for effecting movement of said reflector relative to said optical transceiver terminals between a first disposition where said S and O locations are optically conjugate and said I and D locations are optically conjugate, and a second disposition were said I and O locations are optically conjugate, said S and L2 locations are optically conjugate, and said L1 and D locations are optically conjugate.

7. A fiber optic bypass switch comprising:
a concave reflector;
loop means, defining a pair of optical fiber ends, called loop ends, for transmitting light from one of said loop ends to the other of said loop ends;
first, second, third, and fourth optical transceiver terminals, each adapted to register a respective optical transceiver at one of four respective locations, designated the S, D, I, and O locations;
fifth and sixth optical transceiver terminals for registering said loop ends at respective fifth and sixth locations, designated the L1 and L2 locations, wherein the locations in the two rows are staggered; and
means for effecting movement of said reflector relative to said optical transceiver terminals between a first disposition where said S and O locations are optically conjugate and said I and D locations are optically conjugate, and a second disposition where said I and O locations are optically conjugate, said S and L2 locations are optically conjugate, sand said L1 and D locations are optically conjugate.

8. A fiber optic bypass switch comprising:
a spherical reflector characterized by a center of curvature;
loop means, defining a pair of optical fiber ends, called loop ends, for transmitting light from one of said loop ends to the other of said loop ends;
first, second, third, and fourth optical transceiver terminals, each adapted to register a respective optical transceiver at one of four respective locations, designated the S, D, I, and O locations;
fifth and sixth optical transceiver terminals for registering said loop ends at respective fifth and sixth locations, designated the L1 and L2 locations;
said six locations being disposed so as to be characterized by first and second symmetry points;
said first symmetry point being midway between said S and O locations and midway between said I and D locations;
said second symmetry point being midway between said I and O locations, midway between said S and L2 locations, and midway between said L1 and D locations; and
means for effecting movement of said reflector relative to said optical transceiver terminals between a first disposition where said center of curvature is at said first symmetry point and a second disposition where said center of curvature is at said second symmetry point.

9. The switch of claim 8 wherein said loop means comprises a single optical fiber, the ends of which define said loop ends.

10. The switch of claim 8 wherein said loop means comprises:

first and second optical fibers, each having first and second ends;

an additional spherical reflector; and means for registering the respective first ends of said first and second fibers at a pair of optically conjugate locations with respect to said additional spherical reflector;

whereupon the respective second ends of said first and second fibers define said loop ends.

11. The switch of claim 8 wherein said six locations are disposed in a linear array.

12. The switch of claim 11 wherein said six locations are equally spaced.

13. The switch of claim 11 wherein said six locations are in the order S, D, I, O, L1 and L2.

14. The switch of claim 8 wherein said six locations are disposed in two rows of three each.

15. The switch of claim 14 wherein the locations in the two rows are staggered.

* * * * *